FIGURE 1
INFRARED ABSORPTION SPECTRUM OF PICKLED CAPSICUM ANUUM

FIGURE 6

GAS CHROMATOGRAPHIC SEPARATION OF THE PYROLITIC DECOMPOSITION PRODUCTS OF PEANUT OIL EXTRACTED PICKLED CAPSICUM ANUUM

United States Patent Office 3,781,424
Patented Dec. 25, 1973

3,781,424
HEMORRHOID TREATMENT PREPARATION PRODUCED FROM HOT CHERRY PEPPERS
Edwin K. Ponvert, 3713 Little Neck Point,
Virginia Beach, Va. 23452
Continuation-in-part of application Ser. No. 656,700, July 28, 1967, which is a continuation-in-part of application Ser. No. 402,018, Oct. 6, 1964, both now abandoned. This application July 21, 1970, Ser. No. 56,826
Int. Cl. A61k 27/00
U.S. Cl. 424—195　　　　　　　　　　　　　　　9 Claims

ABSTRACT OF THE DISCLOSURE

The present invention relates to a process, and the product thereof, whereby a new composition of matter is produced. This new composition of matter has no known chemical formula, it being a complex mixture of many chemicals of unknown organic structure. This new composition of matter, a soft solid residue of *Capsicum anuum*, is intended for oral administration in various forms, and prescribed dosages, to human beings suffering from hemorrhoids. Hemorrhoids, are not known to exist in animals. It is, therefore, intended as a hemorrhoidal remedy for the relief of hemorrhoids in mankind.

---

This application is a continuation-in-part application of my earlier filed copending application Ser. No. 656,700, filed July 28, 1967, now abandoned, which in turn is a continuation-in-part application of my earlier filed application Ser. No. 402,018, filed Oct. 6, 1964, now abandoned.

This new composition of matter is derived as a residue by the process of extracting the hot, burning, unpleasant, acrid substance known as "capsaicin" from *Capsicum anuum* by steeping the de-cored and de-seeded pickled ripe fruit of capsicum anuum in a vegetable oil (olive and peanut oils are preferred) for a fixed period of time. Such period of time is determined by organoleptic tests.

This new composition of matter derived as a residue of pickled *Capsicum anuum* possesses the following elemental characteristics:

|  | Percent |
|---|---|
| (a) Carbon content | 37.06 |
| (b) Hydrogen content | 5.47 |
| (c) Nitrogen content | 1.87 |
| (d) Oxygen content | 31.74 |

These values were derived by standard laboratory procedures. It should be noted that the reproducability factor for normal homogenous compounds is ±0.3 to 0.5% for carbon, hydrogen, and nitrogen. Oxygen determination is dependent on the presence of moisture and other oxide forming compounds. There can be no valid determination of molecular weight due to the diffusion of the various elements in the residue.

Figure 1:
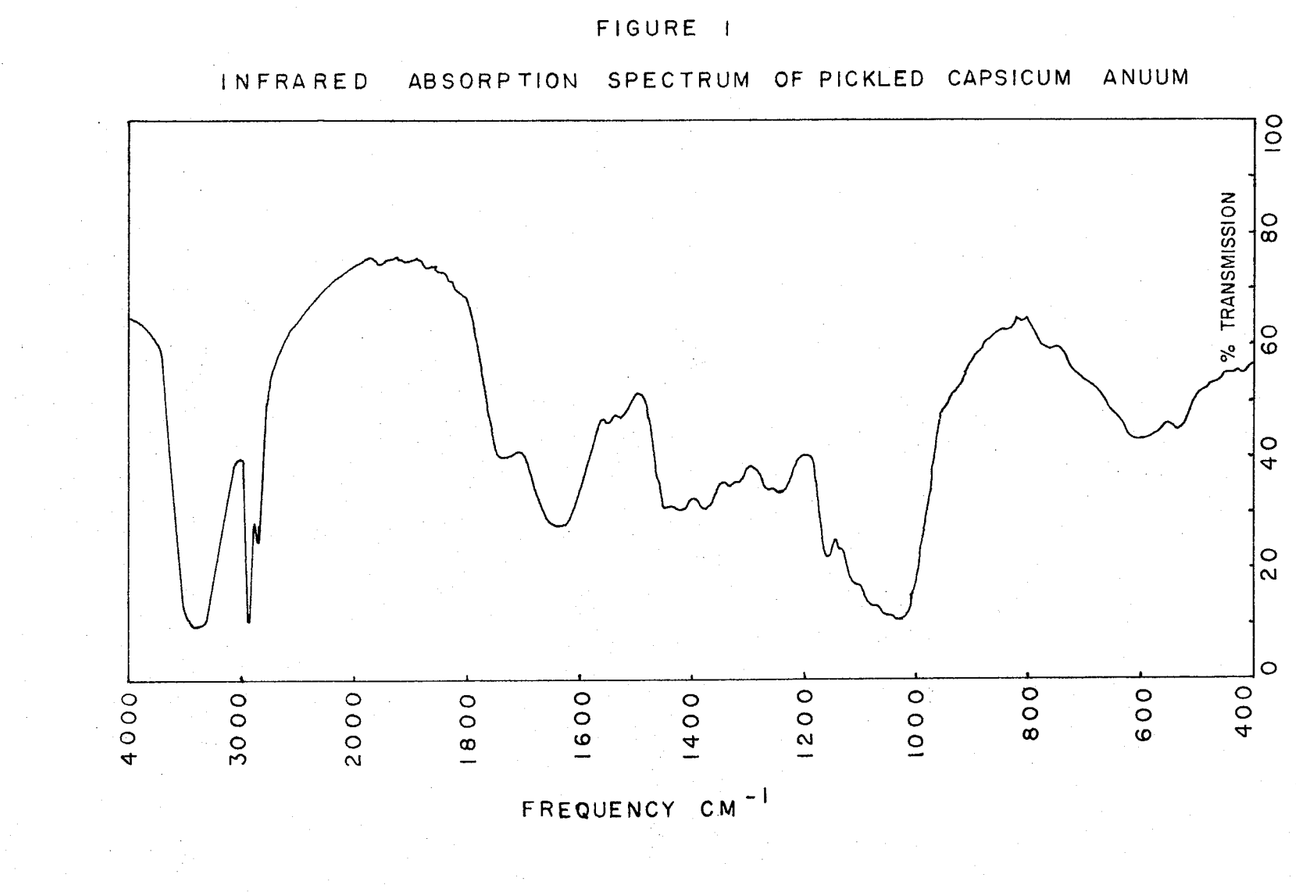
--Figure 1
    With the ordinate labelled wave number in centimeters$^{-1}$ and the abscissa labelled percent transmission this figure represents the infrared spectra of a pickled hot pepper (capsicum anuum) obtained by using the Potassium Bromide Pelletizing technique of sample preparation.
Figure 2:
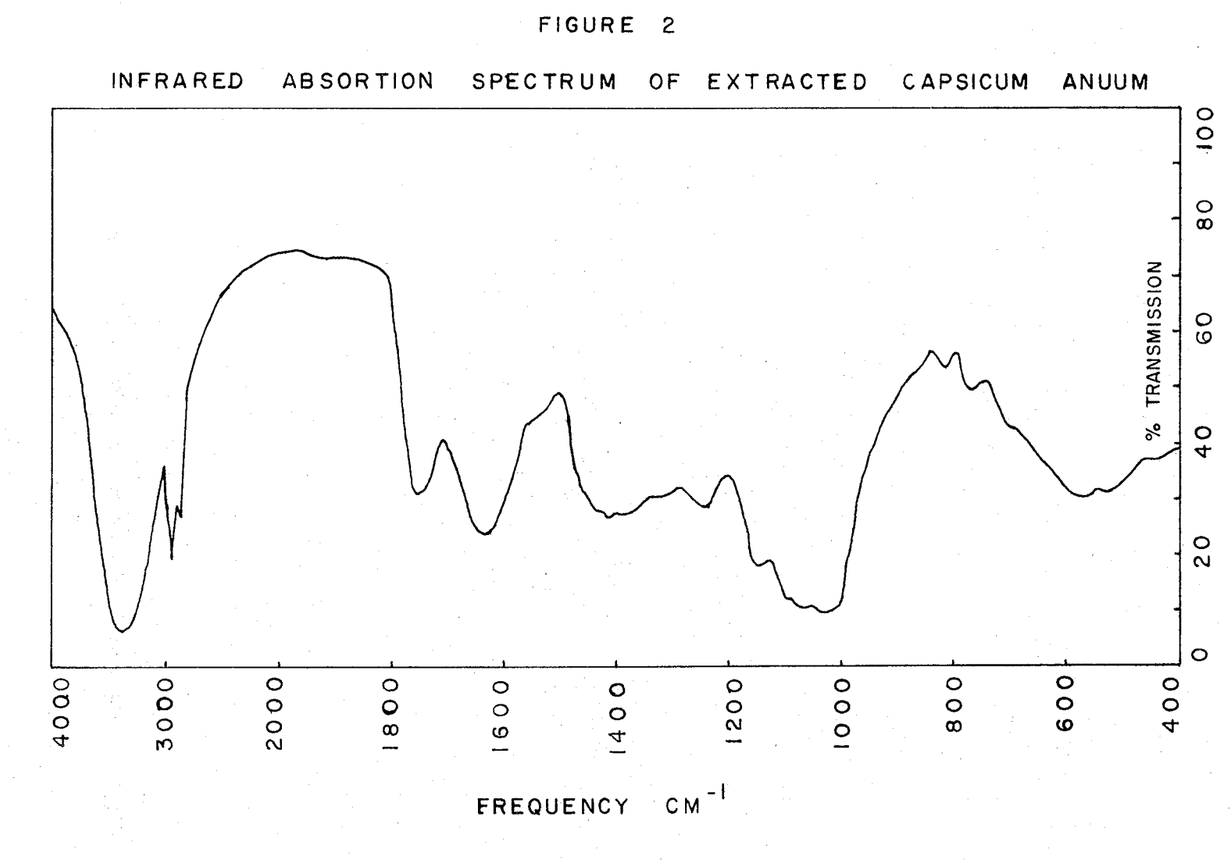
Figure 2
    With the ordinate labelled wave number in centimeters$^{-1}$ and the abscissa labelled percent transmission this figure represents the infrared spectra of a peanut oil extracted pickled hot pepper (capsicum anuum) obtained by using the Potassium Bromide Pelletizing technique of sample preparation.
Figure 3:
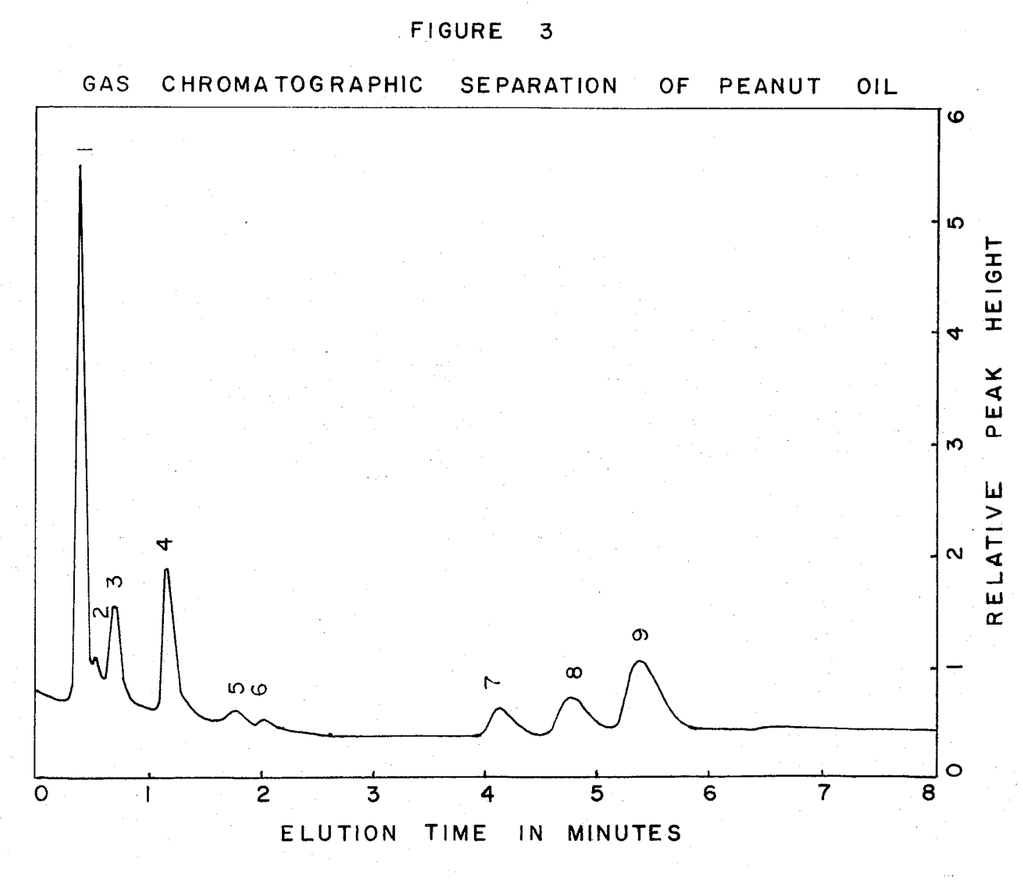
Figure 3
    Run under the following conditions: column construction 8 ft., 10% SE - 30 on Chromsorb W, column temperature 150°C, detector temperature 225°C, injection port temperature 180°C, Hydrogen flow rate 25 ML per minute, Helium carrier flow rate 25 ML per minute, Air flow rate 250 ML per minute, Sample size 1.0 microliter, and chart speed of 1 inch per minute, this figure with its ordinate labelled elution time in minutes, and numbered from top to bottom 0 to 8, and its abscissa labelled relative peak height and numbered from left to right 0 to 6, represents the gas chromatographic separation of peanut oil and shows 9 separate component peaks labelled 1 to 9 inclusive.
Figure 4:
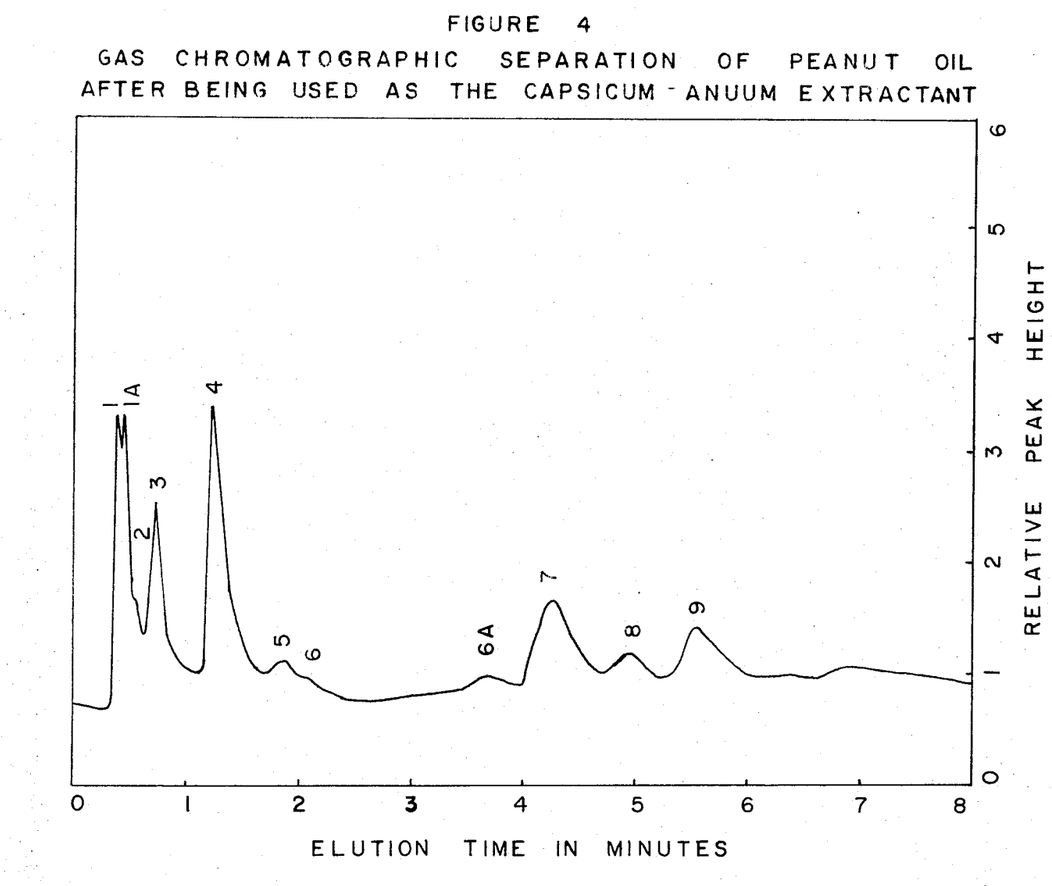
Figure 5:
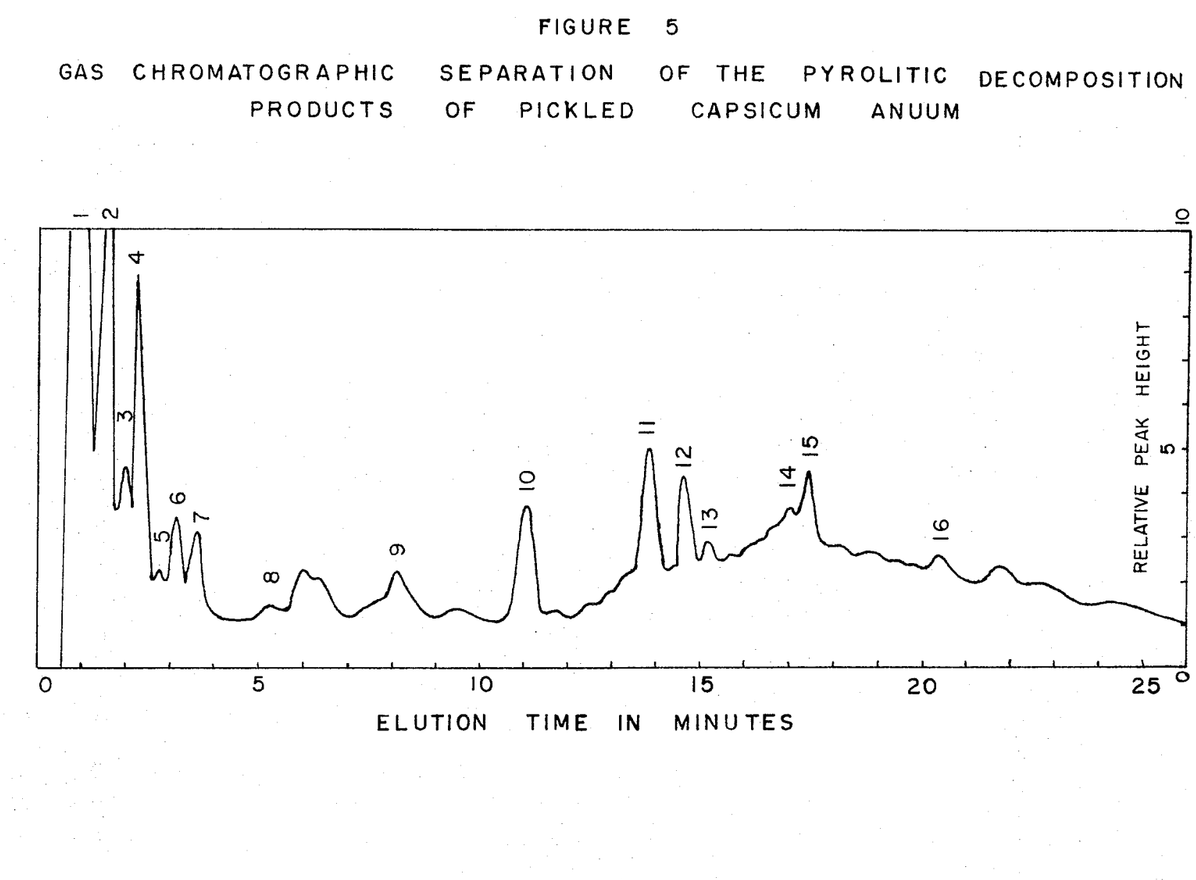
Figure 6:
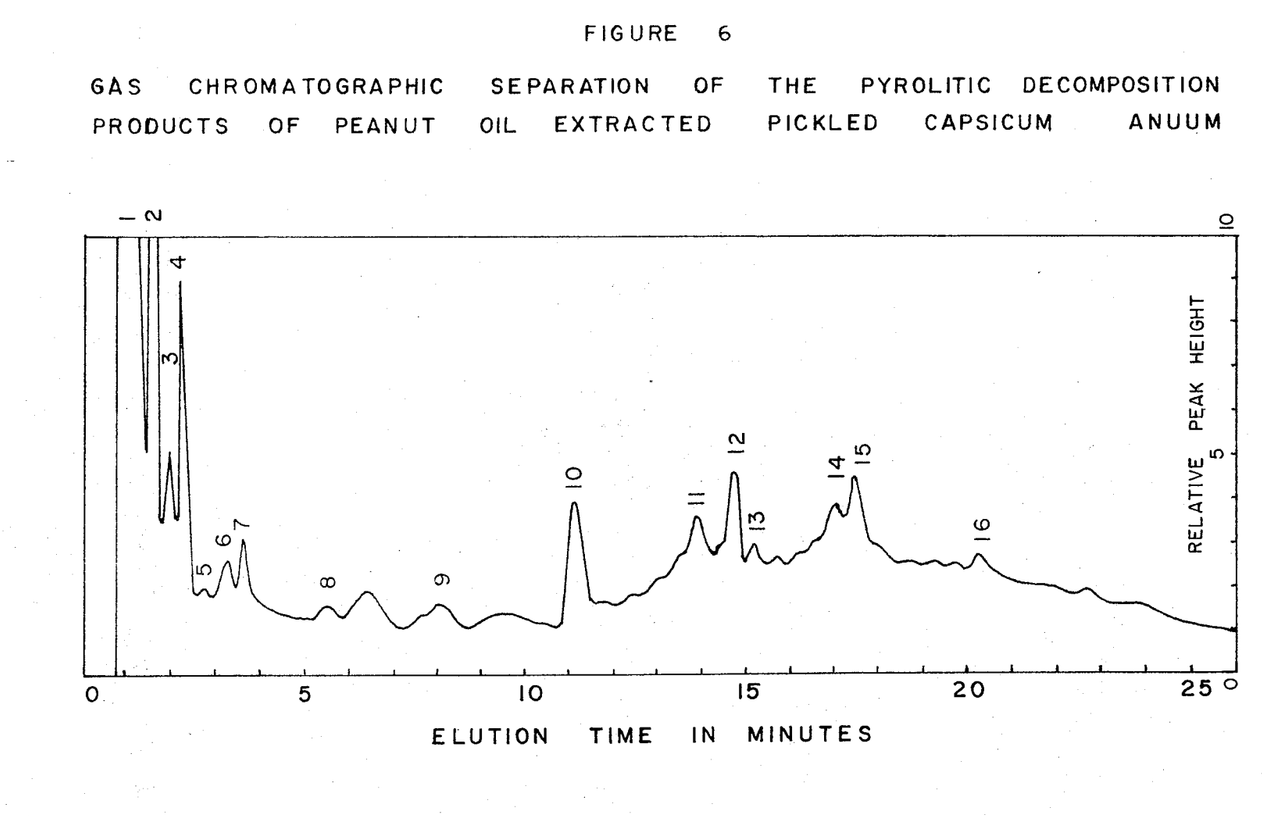
Figure 7:
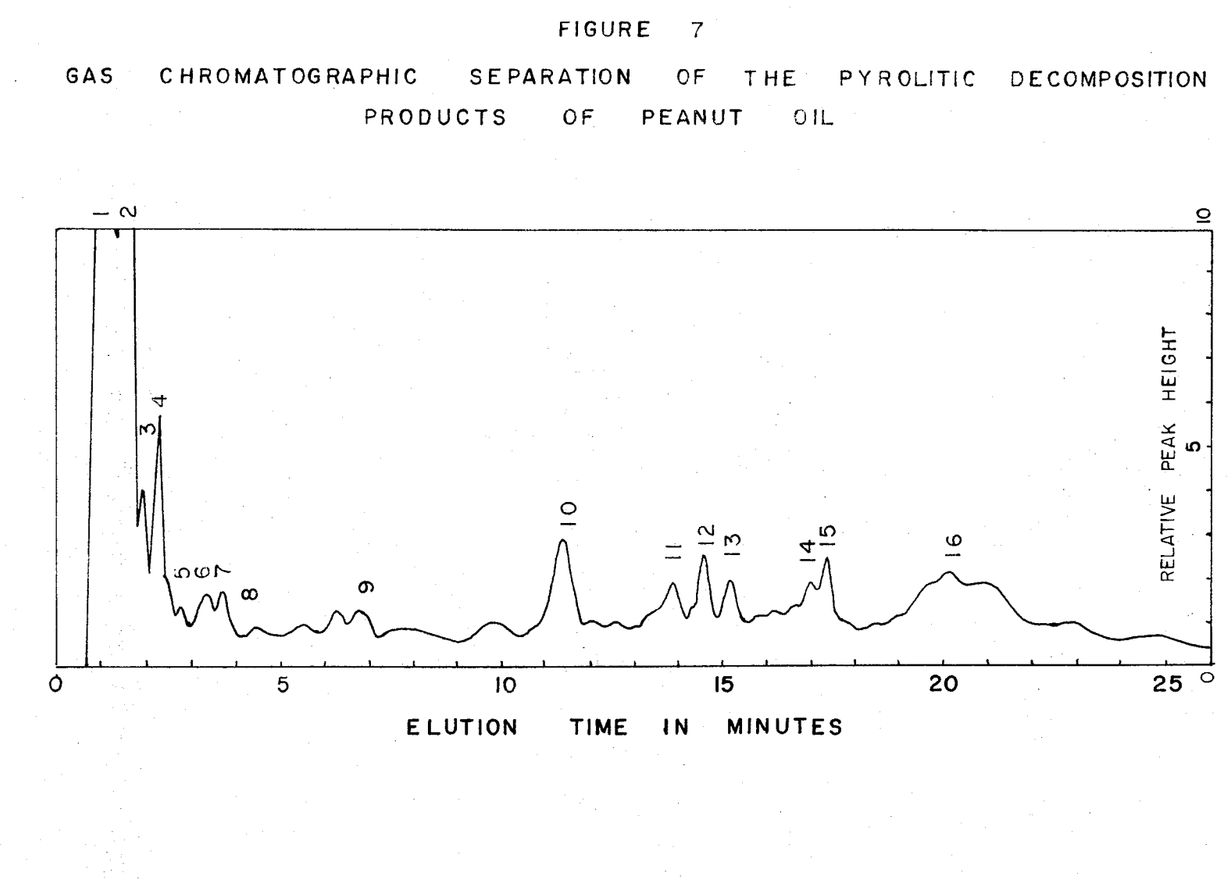
Figure 8:
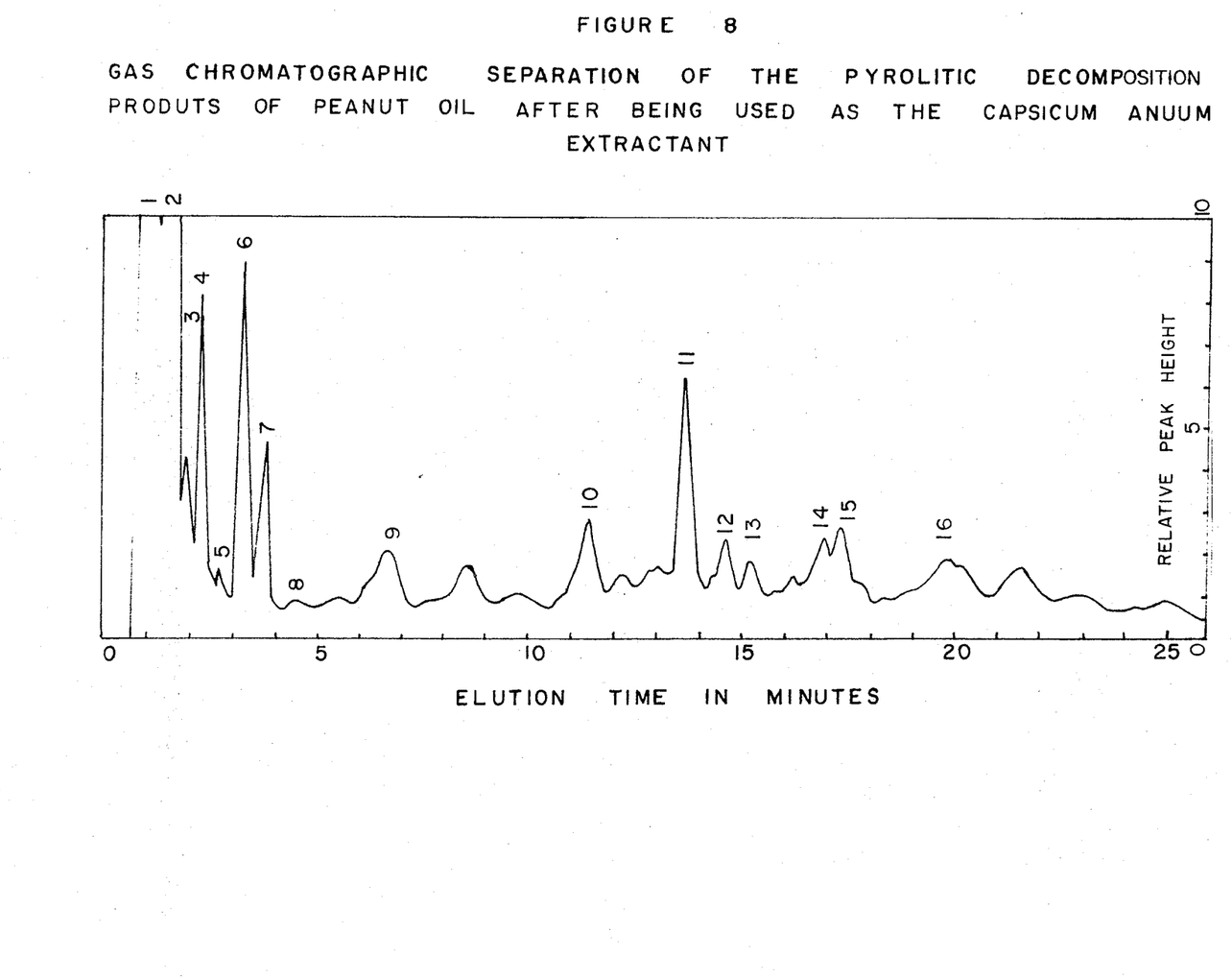

This new composition of matter, a residue of pickled *Capsicum anuum* has an infrared absorption spectrum included in FIGS. 1 through 8, and the figure explanations related to each numbered figure.

The Capsicum fruit preferred for use herein is ripe *Capsicum anuum*, commonly known as hot cherry peppers, red or green in color. Also suitable for use according to my invention are any forms of *Capsicum frutescens* which are known to exhibit physiological activity.

The *Capsicum anuum* fruit utilized by me is ripe, red or green in color, and pickled. The pickling of the hot cherry peppers (*Capsicum anuum*) is vital to my process. Unpickled raw fruit marinated in vegetable oil will be bacterially attacked and putrify before the acridity (capsaicin) can be extracted from the fruit. Such residue is obviously unfit for human consumption. Further, the pickled fruit in large quantities, where required, can be kept indefinitely in the pickling solution. Raw fruit, unpickled, cannot be so kept.

The physiological reaction of each human being to any given remedy cannot always be predicted as a constant. Many people react badly to a commonly used drug, aspirin, while others derive great relief from it. While no person has reacted badly to my preparation there is factual evidence in the clinical studies indicating that individuals given the same dosage have evidenced variations in physiological reaction and in the time for such reaction to occur. The degree of severity of the disease (hemorrhoids) may also affect the time needed to secure satisfactory results. For such reasons, the length of time the preparation must be administered must be given some leeway. An average of fourteen (14) to eighteen (18) days is reasonable, and has varied from five (5) to eighteen (18) days. There is no clinical evidence to support the necessity for a longer time of administration, but a combination of human factors where the hemorrhoids are very severe and the individual's physiological reaction time is slow could necessitate longer administration, or an increase in frequency of daily doses.

Variations occur in the steeping or leaching time required to remove substantially all the acridity (capsaicin) from the immersed peppers. The fact, as cited in the Merck Index, that capsaicin exists in from .1% to 1% in *Capsicum anuum* is a variable in itself. The steeping time, therefore, is subject to variation in relation to the concentration of capsaicin present in the peppers. This is a variation by nature and is not a constant. The steeping time should, therefore, vary from fourteen (14) days to twenty-eight (28) days to allow sufficient time to extract the concentration of capsaicin present. It has never been necessary to exceed twenty-eight (28) days, and no preparation was made with les than fourteen (14) days steeping time.

Any food grade vegetable oil may be used, but imported olive oil or peanut oil is preferred.

There is no need to set forth the fact that hemorrhoids exist in human beings and that their presence is harmful and causes great pain and distress in many instances. They are said to exist in from 30% to 35% of the population, and that 70% of the population suffers from them at some time during life. Over the years many so-called curatives or remedies have been developed and marketed. To my knowledge, none of them, in many and varied forms, have succeeded in substantially curing hemorhoids. Most act as temporary palliatives, or local anesthetics. There is a clear need for medication, short of surgery, which will substantially relieve a hemorrhoidal condition. Many people refuse surgery from fear, others cannot withstand such shock. The exact nature and cause of hemorrhoids has never been clearly defined by the medical profession. Surgery is costly, painful and difficult, and can only remove the physiological presence of hemorrhoids, with no guranatee that they will not recur. Too often they do. I make no claim for my hemorrhoid treatment preparation beyond those expected of surgery. However, achieving substantially the same therapeutic result as surgery, the eradication of the physiological presence of hemorrhoids, it is patently obvious that repeating the regimen set forth for my preparation is far the most acceptable course, if they do recur.

REFERENCE SHEET

The information contained herein forms an integral part of this specification, and will be found aidful as regards materials, equipment, terms, and reference sources.

Materials (1) Ripe pickled "hot" cherry peppers (*Capsicum anuum*). A natural food product, of food grade, commercially available, packed by Block & Guggenheimer, Inc., Long Island City, N.Y.

(2) These peppers are pickled by the packer as follows: One gallon of pepper (*Capsicum anuum*) of medium size weighs approximately 5.5 pounds (2500 grams). This weight is based on a whole average medium sized pepper weighing 28–30 grams.

Pickling process (per gallon of peppers):

(a) A small slit is made in each peper to insure penetration of the brine pickling solution.
(b) One pound of salt (454 grams) was dissolved in one gallon of water producing a brine salinity of 11.78%.
(c) This brine solution was poured over the peppers (2500 gms. approx.) which were in a container and allowed to stand for 22 hours (approx.), the peppers being totally immersed in the brine.
(d) After 22 hours the brine solution was drained, the peppers rinsed in fresh water and then placed in one gallon containers.
(e) A liquid mixture consisting of 2.5 quarts of vinegar (distilled, acetic acid content not to exceed 5%), one pint of fresh water, 56.75 grams of salt, 12.5 grams of tumeric, and .05 gram of Polysorbate 80 Veg. was made. This volume was approximately 3 quarts. This liquid mixture was brought to a boil and poured over the peppers in the gallon container.
(f) The container was capped and immersed in a boiling water bath for 15 minutes.

The containers or jars were then labelled and shipped to many points as commercially available shelf items.

Nothing herein shall prevent the pickling of said hot peppers (*Capsicum annum*) by any method known to those skilled in the art of pickling and preserving. The use of a commercial brand of hot peppers by me was simply their ready availability as shelf items in a store.

(3) A vegetable oil. A natural food product, of food grade, commercially available. The olive oil is an import, the peanut oil a U.S. product. Both were used in the process and/or product of this specification, and so noted when used.

(4) Neither the peppers nor the oils used have any known toxicity.

Equipment (1) Jars, beakers, measuring and weighing devices, etc.
(2) Strainers:

(a) An ordinary strainer with openings of no more than ¼ inch diameter.
(b) Fine mesh screen, #14 American Chemical Society Standard Screen Scale.

(3) Homo - mixer—Manufactured by Eppenbach. Homogenizing mill—Manufactured by Eppenbach.
(4) Centrifuge—International Manufacturing Company.
(5) Lyophilizing—A process of freeze drying material to remove all liquid and moisture from various materials. Well known and used in the food and pharmaceutical industries to produce essentially totally dry powdered material. My lyophilized powder was processed by: Refrigeration for Science Inc., 3441 5th St., Oceanside, N.Y.
(6) Pepper standard—The average size pepper is approximately 1¼ inch in diameter and weighs, on an average, 16.5 grams (wet) after de-coring, de-seeding, and removal of seed pods. The oral consumption of from two (2) to four (4) such peppers constitutes the average daily dosage.
(7) Dosage duration—An average of from fourteen (14) to eighteen (18) days.
(8) The residue—Hereinafter is set forth the process by which acridity (capsaicin) is extracted from the ripe pickled fruit of *Capsicum anuum*, in a manner nondestructive in nature, so as to produce a new composition of matter, organically sound, substantially totally free of acridity (capsaicin), and wholly acceptable for human consumption, orally. Such residue forms the basis of all products prepared in any form. Hereinafter it shall be referred to as "the residue," having the elemental and infrared characteristics previously set forth.

Reference sources (1) The Merck Index cites the presence of fixed oil (capsaicin) in *Capsicum anuum* as from .1% to 1%.
(2) The Handbook of Biological Data by William S. Spector (1956) cities *Capsicum anuum* as being composed of 92.4% water ($H_2O$). The remainder is other organic matter including the .1% to 1% fixed oil (capsaicin).

The process by which the residue is produced as defined in claim (1) comprises the following:

The removal of substantially all acridity (capsaicin) from pickled "hot" cherry peppers, the ripe fruit of *Capsicum anuum*, red or green in color, leaving the resultant residue of the *Capsicum anuum* in a soft solid state, organically sound and fit for human consumption.

(a) The peppers must be pickled and preserved.
(b) The pickled hot peppers are de-cored, de-seeded, and the seed pods removed.
(c) They are then diced (about ½ inch squares) to gain maximum surface exposure to the oil.
(d) They are placed in a glass jar, screw cap type, or other suitable container.
(e) The glass jar is filled to the very top with a vegetable oil, imported olive or peanut preferred, totally immersing the diced peppers.
(f) Slight agitation with a glass rod for several minutes allows trapped air to escape. More oil may be needed to allow for practically no air space in the jar. The jar is then sealed by the screw cap.
(g) At ambient temperatures the peppers are allowed to steep for two calendar weeks (14 days). No agitation is needed.
(h) After fourteen (14) days the jar is opened and several pieces are tested organoleptically (taste and smell) to determine if all acridity (capsaicin) has been leached or extracted from the peppers.
(i) If no acridity can be detected, the peppers, as a soft solid residue, are bland and are fully acceptable, from a sensory and organic standpoint, for human consumption.
(j) If traces of acridity still remain after fourteen (14) days the hot acrid oil should be decanted.
(k) The peppers should be drained through a strainer or colander of a mesh size adequate to prevent any loss of pepper solids.
(l) After draining, the peppers should be transferred to a clean glass jar and steps (e) and (f) repeated.
(m) Allowed to steep at ambient temperatures for an additional seven (7) days, they should again be tested for acridity as before. If no acridity exists they are fully acceptable as in step (i).
(n) If traces of acridity still exist the jar should be recapped, without decanting the oil, and allowed to steep for seven (7) additional days.
(o) The Merck Index cites the fact that in *Capsicum anuum* fixed oil (capsaicin) is present in from .1% to 1%. Any variation in this concentration logically controls the time of marination varying from fourteen (14) days to twenty-eight (28) days. Necessity to exceed twenty-eight (28) days of marination has never occurred. Further marination if necessary would in no way be harmful to the peppers.
(p) The peppers after twenty-eight (28) days of marination should be again tested for acridity, and should be in the condition of step (i).
(q) The residue so obtained should be rinsed lightly with fresh oil to remove any surface adhering hot acrid oil.

THE PRODUCT

The product is the residue obtained from the process. This residue is a new composition of matter for which no formula is known. It is a complex mixture of many chemicals of unknown structure. It can only be stated by the inventor to be a soft solid, red, green, or mixture of both in color, bland and substantially totally free of acridity (capsaicin). It is organically sound, and exhibits the elemental and infrared characteristics already set forth. In various forms, it is prepared for ease of oral administration to human beings suffering from hemorrhoids. Examples of three forms used and tested thus far are:

Paste—Example I (1) Five hundred ninety-four (594) wet grams of the residue were used. This reisdue was the result of fourteen (14) days of steeping in olive oil. The regimen was set for eighteen (18) days of oral administration at thirty-three (33) wet grams per day.

(2) This mass (594 wet grams) was placed in the glass mixing chamber of a homo-mixer.

(3) Sufficient oil was added to insure proper emulsification.

(4) The mass was emulsified for five (5) minutes.

(5) After ten (10) minutes of rest the texture was checked by feeling a sample.

(6) It was emulsified for five (5) additional minutes and found satisfactory by feel.

(7) Allowed to rest for two (2) hours the emulsion was observed for separation of oil and solid matter. There was observable precipitation and separation.

(8) The mass was transferred to a centrifuge, care being taken to minimize any loss of material.

(9) The mass was centrifuged at 2000 r.p.m. for ten (10) minutes.

(10) The extractant was decanted and the paste material allowed to rest for two (2) hours.

(11) There was no evidence of any separation.

(12) The wet semi-solid paste was emptied into a glass beaker and allowed to rest overnight for further observation.

(13) The following day there was no evidence of separation.

(14) The mass of paste was tested organoleptically for acridity and by feel for texture. It was truly a fine semi-solid wet paste suitable for oral consumption by man.

(15) The mass was weighed and found to weigh two hundred seventy (270) wet grams.

(16) By centrifugation three hundred twenty-four (324) wet grams of oil, moisture, and entrapped air had been extracted.

(17) Since the regimen had been programmed for eighteen (18) days this meant that two hundred seventy (270) wet grams, divided by eighteen (18) would mean fifteen (15) wet grams of paste per day.

(18) The regimen then was set as one (1) teaspoonful (five grams, wet) of paste, after meals, three (3) times per day, orally, for eighteen (18) days.

(19) Sufficient quantity was similarly prepared to clinically test at least four (4) human beings suffering from hemorrhoids, by the regimen noted.

(20) I was unaware of how, where, or when such tests would be conducted. The material was left in the laboratories of Chas. Pfizer & Co., Inc. in Brooklyn, N.Y. for further disposition.

(21) The clinical tests having been completed, a report was sent to me. Affidavits from the Connecticut State Prison attest to the dosage and manner of administration and the therapeutic efficacy of this preparation.

Oily suspension—Example II (1) The residue of the process was used in this preparation. The residue was produced by fourteen (14) days of steeping in olive oil. The regimen was programmed for eighteen (18) days of administration. The dosage per day was set at one (1) tablespoonful (15 cc.) to be taken orally, three (3) times per day, after meals, after thoroughly shaking the contents of the bottle. When not in use it was suggested the bottle and its contents be kept under refrigeration.

(2) Five hundred ninety-four (594) wet grams of residue were processed in exactly the same manner as in steps (2), (3), (4), (5), (6), and (7) of the process for preparation of the wet paste.

(3) The contents of the glass mixing chamber of the homo-mixer was emptied into a graduated beaker.

(4) The contents rested for two (2) hours while precipitation took place.

(5) The volume was noted and a sufficient quantity of fresh olive oil was added to bring the total volume to eight hundred ten (810) cc.

(6) The contents of the graduated beaker (810 cc.) was then emptied into two dark brown bottles (500 cc. each), labeled, and the dosage set forth.

(7) As noted, the regimen was programmed for eighteen (18) days of oral administration, 15 cc. three (3) times per day (total 45 cc. per day) for a total of 810 cc. total oral ingestion. Contents to be well shaken before each usage.

(8) Refrigeration was recommended when not in use.

Lyophilized powder—Example III (1) The residue of the process was used in this preparation. The residue was produced by twenty-eight (28) days of steeping in peanut oil. The regimen was programmed for fourteen (14) days, arbitrarily.

(2) Four hundred sixty-two (462) wet grams of residue were placed in the feed hopper of a homo-mill, the mill clearance being adjusted to a very fine grain setting.

(3) To this mass was added just sufficient water, not oil, to allow for pulverization of the mass and to allow free running of the mill without binding or overheating.

(4) The mass was circulated through the homo-mill for three (3) minutes, after which the texture was tested by hand.

(5) The mass was circulated through the homo-mill a total of five (5) cycles of three (3) minutes duration each, or fifteen (15) minutes.

(6) The mill was a laboratory unit, air cooled, and was shut down between cycles (3 minutes) and allowed to cool before proceeding to the next cycle. The mass was discharged into a glass beaker.

(7) Over a glass receptacle, the mass from the beaker was poured into a #14 fine mesh screen and allowed to drain for five (5) minutes, the liquid flowing into the glass receptacle beneath.

(8) The liquid in the receptacle was inspected to insure no loss of solid material through the screen. The liquid was discarded.

(9) Under very gentle flow of water, at practically no pressure, the mass in the screen was washed and drained into the receptacle below. There was no discernible solid material in the receptacle.

(10) The mass from the #14 screen was emptied into a brown glass jar, with screw cap. Care was taken to scrape the screen clean.

(11) The bottle and its contents were immediately placed under referigation. The pressure of water in this mass could create a fungus or "rope" if left at room temperature for any protracted period of time, such as overnight.

(12) Ideally, the washed mass from the homo-mill should go directly to the freezing phase of the lyophilizing equipment.

(13) Taking the bottled mass from the refrigeration unit it was transported rapidly to the plant doing the lyophilizing.

(14) Actually three (3) batches of 462 wet grams each were prepared, each separately.

(15) The losses to be sustained by this process had never before been determined. The net resultant weight from lyophilization was factually unknown. Each batch was to be lyophilized separately and the loss (if any) noted and compared with what the theoretical weight should be.

(16) Referring to Spector's citation that *Capsicum anuum* contains 92.4% water this would mean that 92.4% of 462 wet grams would be volatilized by lyophilizing, producing a theoretical resultant net weight of thirty-five (35) grams of dry powder.

(17) After lyophilizing the three (3) batches, lyophilized separately, the average of the three was thirty-two (32) grams, dry powder.

(18) Dealing with unknown factors in the lyophilized form, an arbitrary regimen was set prior to such determination of net weight of the powder.

(19) The three (3) batches of lyophilized powder were encapsulated in "00" size gelatin capsules, filled by hand. The average weight of lyophilized powder in each capsule was 189.6 milligrams.

(20) The regimen was arbitrarily set for the administratration of six (6) "00" capsules, of 190 milligrams each, to be taken orally three (3) times per day. This was a daily intake of 3.4 grams. Over the fourteen (14) days this would mean the oral ingestion of 47.9 grams.

(21) Since only thirty-two (32) grams had resulted from the lyophilization of the residue this meant that sixteen (16) grams (approximately) more lyophilized powder was needed to meet the total weight of 47.9 grams.

(22) Sixteen (16) grams represents one (1) additional lyophilized pepper per day. Thus the addition of these sixteen (16) grams meant that three (3) not two (2) peppers were ingested as the daily dosage. This falls well within the two (2) to four (4) peppers set forth as the average daily dosage.

(23) An additional day's supply of eighteen (18) capsules (or 3.4 grams) was prepared in the event of loss or destruction of some of the capsules.

(24) The efficacy of this form of preparation has been attested to in affidavit form.

(25) Having produced the lyophilized (freeze dried) powder it can readily be given other forms such as tablets, lozenges, pills, etc. I am informed by experts in the art of pharmaceutical packaging that the dosage of 3.4 grams per day can be compressed into tablets or lozenges, of acceptable size for human ingestion, thereby reducing the dosage to one (1) such tablet or lozenge taken three (3) to four (4) times per day.

Accordingly what is claimed and desired to be secured by Letters Patent is:

1. A product which is a residue of a decored, deseeded ripe pickled fruit of *Capsicum anuum* or *Capsicum frutescens* from which substantially all acridity has been extracted, said product being a composition of matter and having:
   (a) an elemental analysis as follows: carbon—37.06%; hydrogen—5.47%; nitrogen—1.87%; oxygen—31.74%;
   (b) a characteristic infrared absorption spectrum as shown in Figure 2 of the accompanying drawing; and
   (c) a characteristic gas phase chromatographic separation of its pyrolitic decomposition products as shown in Figure 6 of the accompanying drawing.

2. A method for relieving a hemorrhoidal condition comprising orally administering an effective hemorrhoid relieving amount of the product of claim 1 to a human being suffering from hemorrhoids.

3. The method of claim 2 wherein the product is administered in the form of a paste.

4. The method according to claim 2 wherein the product is administered in the form of an oily suspension.

5. The method according to claim 2 wherein the product is administered in the form of an emulsion.

6. The method according to claim 2 wherein the product is administered in the form of a lyophilized powder.

7. The method according to claim 6 wherein the powder is capable of being formed into a capsule, lozenge or pill.

8. The method according to claim 2 wherein an equivalent of at least about 33 wet grams of residue are administered daily.

9. The method according to claim 8 wherein the residue is administered for from five to eighteen days.

References Cited

King; Am. Dispensatory, 8th Ed. (1870), pp. 184–186.

JEROME D. GOLDBERG, Primary Examiner.

V. D. TURNER, Assistant Examiner.

UNITED STATES PATENT OFFICE
CERTIFICATE OF CORRECTION

Patent No. 3,781,424            Dated December 25th, 1973

Inventor(s) Edwin K. Ponvert

It is certified that error appears in the above-identified patent and that said Letters Patent are hereby corrected as shown below:

At Column 1, between lines 59 and 60, insert the following:
Figure 4
    Run under the following conditions: column construction 8 ft., 10% SE-30 on chromsorb W, column temperature 150°C, detector temperature 225°C, injection port temperature 180°C, Hydrogen flow rate 25 ML per minute, Helium carrier flow rate 25 ML per minute, Air flow rate 250 milliliters per minute, sample size 1.0 microliter and chart speed of 1 inch per minute,

UNITED STATES PATENT OFFICE
CERTIFICATE OF CORRECTION

Patent No. 3,781,424    Dated December 25th, 1973

Inventor(s) Edwin K. Ponvert

It is certified that error appears in the above-identified patent and that said Letters Patent are hereby corrected as shown below:

(continued)
this figure with its ordinate labelled elution time in minutes and numbered from top to bottom 0 to 8, and its abscissa labelled relative peak height and numbered from left to right 0 to 6 represents the gas chromatographic separation of peanut oil after being used as the hot pickled pepper (capsicum anuum) extractant and shows a total of 11 components labelled 1, 1A, 2, 3, 4, 5, 6, 6A, 7, 8, and 9, with components 1, 2, 3, 4, 5, 6, 7, 8 and 9 being the same as those shown in Figure 3, with 1A and 6A being the new components obtained during the extraction process of the pickled hot peppers (capsicum anuum).

Figure 5
Run under the following conditions: column construction 6 ft 15% SE-30 on chromsorb W, column temperature 100°C isothermal for 9 minutes, program temperature rise to 150°C for 8 minutes, isothermal 150°C for 9 minutes, detector hydrogen flame, pyrolysis current 90 miliamperes for 30 seconds, Hydrogen flow rate 25 milliliters per minute, Helium carrier flow rate 25 milliliters per minute, Air flow rate of 250 milliliters per minute, sample size 2 milligrams, chart speed 1 inch per minute, this figure with its ordinate labelled elution time in minutes and numbered from top to bottom 0-26, and its abscissa labelled relative peak height and numbered from left to right 0 to 10, represents the gas phase chromatographic separation of the pyrolitic decompositic products of pickled hot peppers (capsicum anuum) with peak numbers 1 to 16 inclusive representing the major product of said pyrolitic decomposition, and the following data calculated from the integrated area under the peaks to zero base line:

| | | |
|---|---|---|
| 1=53.80% | 6=1.14% | 11=5.10% |
| 2= 4.17% | 7=1.01% | 12=2.44% |
| 3= 1.05% | 8=3.40% | 13=1.14% |
| 4= 2.51% | 9=1.74% | 14=4.90% |
| 5= 4.93% | 10=4.01% | 15=1.97% |
| | | 16=7.05% |

UNITED STATES PATENT OFFICE
CERTIFICATE OF CORRECTION

Patent No. 3,781,424         Dated December 25th, 1973

Inventor(s) Edwin K. Ponvert

It is certified that error appears in the above-identified patent and that said Letters Patent are hereby corrected as shown below:

(continued)

Figure 6

Run under the identical conditions as set forth for Figure 5, this figure represents the gas phase chromatographic separation of the pyrolitic decomposition products of peanut oil extracted pickled hot peppers (capsicum anuum) with graph numbers 1 through 16 representing the major products of said pyrolitic decomposition, and the following data calculated from the integrated area under the peaks to the zero base line:

| | |
|---|---|
| 1=75.36% | 9=1.14% |
| 2= 5.46% | 10=2.18% |
| 3= 0.64% | 11=2.85% |
| 4= 2.02% | 12=1.15% |
| 5= 0.65% | 13=0.44% |
| 6= 0.96% | 14=2.31% |
| 7= 0.75% | 15=1.00% |
| 8= 2.71% | 16=0.36% |

Figure 7

Run under the identical conditions as set forth for Figures 5 and 6, this figure represents the gas phase chromatographic separation of the pyrolitic decomposition products of peanut oil with graph numbers 1 through 16 representing the major products of said pyrolitic decomposition and the following data calculated from the integrated area under the peaks to the zero base line:

| | |
|---|---|
| 1=11.25% | 9=0.23% |
| 2=83.80% | 10=0.49% |
| 3= 1.98% | 11=0.40% |
| 4= 0.24% | 12=0.19% |
| 5= 0.05% | 13=0.10% |
| 6= 0.10% | 14=0.33% |
| 7= 0.08% | 15=0.15% |
| 8= 0.04% | 16=0.66% |

UNITED STATES PATENT OFFICE
CERTIFICATE OF CORRECTION

Patent No. 3,781,424          Dated December 25th, 1973

Inventor(s) Edwin K. Ponvert

It is certified that error appears in the above-identified patent and that said Letters Patent are hereby corrected as shown below:

(continued)

Figure 8

Run under the identical conditions as set forth for Figures 5, 6 and 7, this figure represents the gas phase chromatographic separation of the pyrolitic decomposition products of peanut oil after its use as a hot pickled pepper (capsicum anuum) extractant, with graph numbers from 1 through 16 representing the major products of said pyrolitic decomposition and the following data calculated from the integrated area under the peaks to the zero base line:

| | |
|---|---|
| 1 = 21.8% | 9 = 0.31% |
| 2 = 72.50% | 10 = 0.66% |
| 3 = 1.61% | 11 = 0.67% |
| 4 = 0.48% | 12 = 0.22% |
| 5 = 0.10% | 13 = 0.16% |
| 6 = 0.29% | 14 = 0.39% |
| 7 = 0.20% | 15 = 0.14% |
| 8 = 0.06% | 16 = 0.52% |

Signed and sealed this 8th day of October 1974.

(SEAL)
Attest:

McCOY M. GIBSON JR.
Attesting Officer

C. MARSHALL DANN
Commissioner of Patents